US008105451B2

(12) United States Patent
Krebs et al.

(10) Patent No.: US 8,105,451 B2
(45) Date of Patent: Jan. 31, 2012

(54) METHOD AND SYSTEM FOR ENHANCED MANUFACTURING OF BIOMASS-BASED PRODUCTS

(75) Inventors: Niels Krebs, Hellerup (DK); Sten Dueholm, Hellerup (DK)

(73) Assignees: Force Technology, Brondby (DK); Wesser Og Dueholm Arkitekt-Og Ingeniorfirma V/Sten Dueholm, Hellerup (DK)

( * ) Notice: Subject to any disclaimer, the term of this patent is extended or adjusted under 35 U.S.C. 154(b) by 803 days.

(21) Appl. No.: 11/884,432

(22) PCT Filed: Feb. 17, 2006

(86) PCT No.: PCT/DK2006/000098

§ 371 (c)(1), (2), (4) Date: Sep. 19, 2008

(87) PCT Pub. No.: WO2006/086993

PCT Pub. Date: Aug. 24, 2006

(65) Prior Publication Data

US 2009/0211692 A1 Aug. 27, 2009

(30) Foreign Application Priority Data

Feb. 18, 2005 (DK) ................................ 2005 00256

(51) Int. Cl.

| | |
|---|---|
| ***B29C 65/18*** | (2006.01) |
| ***B32B 21/02*** | (2006.01) |
| ***B06B 1/20*** | (2006.01) |

(52) U.S. Cl. ... 156/73.1; 156/62.2; 156/497; 156/583.1; 264/442; 425/174.2

(58) Field of Classification Search ................. 156/73.1, 156/73.2, 62.2, 62.4, 497, 538; 264/115, 264/121, 442; 425/80.1, 82.1, 174.2
See application file for complete search history.

(56) References Cited

U.S. PATENT DOCUMENTS 5,582,644 A * 12/1996 Gaddis et al. ................. 118/303
6,079,508 A 6/2000 Caza et al.

FOREIGN PATENT DOCUMENTS

WO WO 98/41683 9/1998
WO WO 03/037582 5/2003
WO WO 2006/021212 3/2006

OTHER PUBLICATIONS

Otto Suchsland and George E. Woodson , "Fiberboard Manufacturing Practices in the United States", Agriculture Handbook No. 640, 1986, pp. 104-107, United States Department of Agriculture, Forest Service, United States.

* cited by examiner

*Primary Examiner* — Michael Tolin
(74) *Attorney, Agent, or Firm* — Day Pitney LLP

(57) ABSTRACT

A method and a device to be used in the process of manufacturing plates, such as fiberboards or the like boards, where the raw material in form of bio-mass particles, such as wood fibers or the like, applied with a thermosetting binder is spread onto a forming belt to form a mat, and where said mat by means of a hot press is compressed into the desired thickness of the finished plate and the thermosetting binder is hardened. According to the inventing a system and corresponding method for manufacturing biomass-based products is provided that has enhanced efficiency due to the application of ultra sound.

28 Claims, 9 Drawing Sheets

METHOD AND SYSTEM FOR ENHANCED MANUFACTURING OF BIOMASS-BASED PRODUCTS

FIELD OF THE INVENTION

Generally, the invention relates to a method and a system of enhancing the process of manufacturing of biomass-based products. More particularly, the method and system comprises the use of one or more high-intensity ultrasound devices with the aim of enhancing traditional processes of manufacturing of reconstituted biomass-based products.

BACKGROUND OF THE INVENTION

As examples of processes for manufacturing biomass based products, manufacturing of reconstituted biomass-based products such as Medium Density Fibreboards (MDF), Particleboards (PB), Oriented Strand Boards (OSB) and the like products can be mentioned. Such manufacturing is basically made in processes as schematically shown in FIG. 1_a-c_ and described below. Similar processes are used when producing pulp and paper products.

As a basis of this processes, a raw material in the shape of timber in the form of round wood or wood chips from the forest, or wood residuals in the form of sidings, chips, shavings or sawdust from the wood industry (sawmills, house and furniture industry etc), or recycling wood and wood based materials, or various kinds of agricultural crop residuals such as bagasse (sugar cane residuals), straw etc, is provided.

Basically, manufacturing of reconstituted biomass products such as MDF, PB and OSB comprises the process steps of disintegrating (cutting, milling etc.) the raw material into particles of various size and shape (fibres, particles, strands), drying of these particles to a moisture content suitable for the specific process, applying a binder (usually a thermosetting binder) to the particles, forming the furnish of particles into a mat and finally pressing and curing said mat into a plate-shaped product such as MDF, PB, OSB or the like board or panel.

As the process steps and the succession of the process steps are different for the above mentioned products, the process flow of the 3 products is commented accordingly in the following.

Medium Density Fibreboards (MDF) Manufacturing.

In traditional MDF manufacturing wood chips, preferably on the basis of debarked solid wood are used as raw material;

Bark residuals and dirt are removed from the chips in a chip washer. Using a chip washer to remove dirt and bark residuals requires large amounts of clean water and produces large amounts of contaminated water, handling of which is a very costly process;

The wet chips are milled into fibres in a disc refiner. Milling the biomass chips into fibres in a disk refiner requires large amounts of electric energy and mechanical wear of machinery;

Usually, an aqueous solution of binder is added to the wet fibre furnish in the so-called blow-line at the outlet of the refiner. In the blow line, the fibre furnish tend to agglomerate to large lumps and the binder added in this stage of the process has very limited access to the single fibres;

The fibre-binder mixture is dried in an airborne drying process using hot air as a heating and transportation medium. Also during drying the fibres in an air-borne process the fibres tend to agglomerate and thus make drying inefficient. Additionally, the transfer of heat energy into the fibres and of water vapour out of the fibres is limited by the laminar boundary layer on the surface of the fibres. Alternatively, other techniques to add the binder to the fibre after drying (see e.g. Danish patent application PA 200401297 and patents quoted herein) are used in MDF manufacturing. Application of binder to the fibre furnish after drying is a more modern approach, the efficiency of which, however, in terms of binder distribution on the single fibres is limited by the tendency of the fibres to once again agglomerate to large lumps;

After drying and application of binder, the fibre furnish is screened, usually in an airborne system, in order to remove larger fibre agglomerations, which may cause damage in the hot press. Screening of the fibre furnish to remove fibre lumps is a costly process in terms of equipment, energy and loss of material; Subsequently the fibre furnish is formed into a homogeneous mat, either by an airborne or a mechanical device. Forming of the fibre mat in conventional formers establishes a 2-dimensional orientation of the fibres in the plane of the mat;

Preheating of the fibre mat by introducing steam or hot air or a mixture of steam and hot air Into the surface of the mat may be made.

Finally, the mat is pressed and cured in a hot press.

Particleboard (PB) Manufacturing.

In Particleboard manufacturing, a wider variety of low quality raw material is used (wood residuals, recycling wood, agricultural biomass etc.;

Screening into coarse and fine particles. The efficiency of screening biomass particles by means mechanical sifters or air-borne equipment is limited by the tendency of fine particles and dirt to stick to larger particles;

Large particles are flaked into proper size;

The particle furnish is dried, usually in drum dryers using hot gas as a heating medium and mechanical devices as a transportation medium. Traditional drying of biomass particles in drum dryers using hot air as a heating medium is limited by the laminar boundary layer at the surface of the particle;

The dry particle furnish is usually separated into a fine fraction to be used for the panel surface and a coarse fraction to be used for the panel core. Separation of coarse and fine particles by traditional mechanical or air-borne techniques is limited by the tendency of these particles to stick together;

A binder is added to these fractions separately in mechanical blenders;

The fractions of particle furnish are formed into a 3-layer mat.

Preheating of the fibre mat by introducing steam or hot air or a mixture of steam and hot air into the surface of the mat may be made;

The mat is pressed and cured in a hot press.

Oriented Strand Boards (OSB) Manufacturing.

Oriented Strand Boards (OSB) are made from regular, debarked round wood from the forest;

The logs are cut into thin (0.5-0.7 mm), wide (20-25 mm) and long (100-150 mm) strands;

Cleaning of the strands from dirt and bark contamination is made in a dry process in mechanical sifters. The efficiency of traditional cleaning of strands from dirt and bark contaminations in mechanical sifters is limited by the adhesion of fine particles to the rough surface of the strands;

Drying of strands is made in drum dryers using hot gas as a drying medium and mechanical devices for transportation of the strands. Traditional drying of strands in drum dryers using hot air as a heating medium is limited by the laminar boundary layer at the surface of the strands;

Application of binder in the form of a powder or an aqueous solution of resin is made in rotating drums;

Forming of strands into a mat is made in mechanical devices, orientating the strands into 3 layers parallel and perpendicular to the process direction respectively;

Preheating of the fibre mat by introducing steam or hot air or a mixture of steam and hot air into the surface of the mat may be made;

The mat is pressed and cured in a hot press.

Within the above listed part processes of manufacturing of biomass-based panel board products a number of problems with relation to the boundary layer between the biomass particles and the surrounding process air flow was identified.

Equipment involving turbulent air flow to deal with said problems are pre dominant in known methods.

Other problems with relation to separating particles of various size and shape or particles and contaminations are usually dealt with using equipment based on mechanical vibration or washing water.

Therefore, it is an object of the invention to provide a system (and a corresponding method) for manufacturing biomass-based products having enhanced efficiency.

It is a further object to provide a method and system enabling efficient separation of fibre lumps so they do not lump or stick together in an airflow.

Another object is to enable enhanced forming of fibres into a mat and improved quality of the final product.

Another object is to reduce the consumption of energy in manufacturing biomass-based products.

In the following, novel methods based on a different kinetic technology and corresponding equipment to handle biomass and other particles will be disclosed.

SUMMARY OF THE INVENTION

According to the invention the object is achieved in that a system for processing biomass particles in a gaseous medium comprising a gas and biomass particles further comprises means for generating sound.

In one embodiment, the sound is ultrasound.

For MDF manufacturing, the use of ultrasound has the following advantages.

Using high-intensity ultrasound according to the invention, cleaning of chips can be made in a dry process or with a minimum of water consumption.

Application of high-intensity ultrasound in the refining process is supposed to reduce energy consumption significantly and to keep the refiner discs clean.

High-intensity ultrasound has the capacity to split up both fibre lumps and binder droplets and thus to establish a more homogeneous distribution of binder on the fibres.

High-intensity ultrasound removes the boundary layer more efficiently than any turbulent air flow and thus accelerates the drying process significantly.

The use of high-intensity ultrasound helps to split up both fibre lumps and binder droplets.

Using high-intensity ultrasound to split up fibre lumps before forming of the fibre mat requires less energy and loss of material.

Using high-intensity ultrasound in the forming process allows for a 3-dimensional orientation of the fibres which is supposed to produce a panel product of improved properties perpendicular to the plane of the panel.

For particleboard manufacturing, the use of ultrasound has the following advantages.

High-intensity ultrasound is a very powerful tool to separate dirt and fine particles from larger particles.

High-intensity ultrasound removes the boundary layer more efficiently than any traditional airflow technique and thus helps reduce drying time and energy.

Using traditional mechanical blenders to apply binder to the particles the distribution of binder is limited by the size of the binder droplets and the access of the binder droplets to the particles.

High-intensity ultrasound is a very efficient tool to overcome the problems in relation to mechanical application of the binder, as it helps reduce the size of resin droplets and improve the access to every single particle.

For OSB manufacturing, the use of ultrasound has the following advantages.

High-intensity ultrasound is a very efficient tool to separate fine particles and dirt from any surface.

High-intensity ultrasound removes the boundary layer more efficiently than any traditional airflow technique and thus helps reduce drying time and energy.

In one embodiment, the gas comprises steam.

In one embodiment, the gas comprises atmospheric air.

In one embodiment, the gas comprises a combination of steam and atmospheric air.

In one embodiment, the means for generating sound is arranged to contribute to removing impurities attached to said biomass particles.

In one embodiment, the means for generating sound supports a process of refining biomass particles in a pressurized refiner.

In one embodiment, the system further comprises means for applying a binder solution comprising binder droplets to an airborne flow of biomass particles. The system is adapted to, during use, to apply sound to the airborne flow of biomass particles, before the binder solution is applied whereby biomass particle lumps, if any, in the airborne flow of biomass particles are separated, or substantially at the same time that the binder solution is applied whereby biomass particle lumps, if any, in the airborne flow of biomass particles are separated and binder droplets are reduced to a smaller size.

In one embodiment, the system further comprises a dryer adapted to receive a flow of wet biomass particles and to dry the flow of wet biomass particles using a gaseous medium means for drying a flow of biomass particles. The dryer comprises at least one sound device or is in connection with at least one sound device, where said at least one sound device is adapted, during use, to supply at least a part of said gaseous drying medium to said flow of biomass particles and where said at least one sound device, during use, removes or minimizes a laminar sub-layer being present at the surface of said wet biomass particles.

In one embodiment, the sound supports a separation of particles of various size in a biomass particle screening process.

In one embodiment, the sound splits a biomass lump in a biomass particle lump separation process.

In one embodiment, the sound is applied in a mat forming process of biomass particles.

In one embodiment, the system further comprises means for mat preheating of said biomass particles, using steam or hot air or a mixture of steam and hot air, prior to a hot pressing, wherein the sound is applied before said hot pressing.

The present invention also relates to a method corresponding to the system according to the present invention. More specifically, the invention relates to a method for processing biomass particles in a gaseous medium comprising a gas and biomass particles. The method further comprises the step of generating sound. The method and embodiments thereof correspond to the system and embodiments thereof and have the same advantages for the same reasons. Advantageous embodiments of the method are defined in the subclaims.

The objects (among others) are also solved by a system for enhancing manufacturing biomass-based products, the system comprising: a dryer for receiving an airborne flow of fibres or biomass particles, a binder applicator for applying a binder solution to an airborne flow of fibres received from said dryer, a forming station for producing a fibre or biomass mat from an airborne flow of fibres being applied with said binder solution and being received from said binder applicator, wherein said system further comprises one or more of: at least one ultrasound device adapted, during use, to apply ultrasound to the airborne flow of fibres after said binder solution has been applied and before said airborne flow of fibres is processed in said forming station, at least one ultrasound device adapted, during use, to apply ultrasound to the airborne flow of fibres in said forming station in connection with the production of said fibre or biomass mat, and at least one ultrasound device adapted, during use, to apply ultrasound to said fibre or biomass mat after it has been produced by said forming station.

In this way, the efficiency of the overall production process is enhanced by enhancing one or more of different stages of the manufacturing process by application of ultrasound.

The manufacturing process of biomass-based products involves a number of part-processes where the key technology of the invention provides significant advantages in terms of reduced consumption of raw material, reduced consumption of energy, reduced cost for equipment, increased production capacity, and/or improved quality of the final product.

The driver medium may be chosen depending on the part-process to be supported by means of the effect of the device. In preferably dry parts of the manufacturing process such as drying of material or dry forming of a product, a gaseous medium like atmospheric air will be used to activate the ultrasonic device.

In preferably wet parts of the process such as cleaning of raw material such as e.g. contaminated wood chips, a gaseous driver such as steam may be the obvious choice.

A combination of heated pressurised air and steam may be used, either as a mixture or via separate ultrasound generators.

In one embodiment, the system is adapted to apply steam, superheated steam or hot air in connection with application of ultrasound to said airborne flow of fibres after said binder solution has been applied and before said airborne flow of fibres is processed in said forming station, and/or said airborne flow of fibres in said forming station in connection with the production of said fibre or biomass mat, and/or said fibre or biomass mat before it is received In a pressing station.

In one embodiment, the system comprises one or more ultrasound devices adapted to replace or support traditional cleaning techniques whereby the cleaning effect is improved by the application of ultrasound that efficiently unsticks/removes dirt particles from the biomass particle surface.

In one embodiment, the system comprises one or more ultrasound devices adapted to enhance a separation effect in the process of separation of particles of various size and shape as used in multilayer particleboards or Oriented Strand Boards, where the separating effect by the application of ultrasound supports the effect of mechanical sifters I screeners.

In one embodiment, the system comprises one or more ultrasound devices adapted to apply ultrasound and steam into a refiner cavity In the process of refining pulp chips in a pressurised refiner where saturated steam at high pressure is fed into the cavity between the refiner discs whereby a high-intensive ultrasound level, which assists a fully or partly disintegration of the pulp chips, is established.

In one embodiment, the system comprises one or more ultrasound devices at various positions along a blowline, preferably both before and after the application of binder, adapted to produce a very homogeneous distribution of the binder on the single fibers in a traditional MDF manufacturing process where the wet fiber furnish from a refiner is fed into a blowline and an aqueous solution of binder is added.

In one embodiment, the binder applicator is adapted to apply a binder solution comprising binder droplets to said airborne flow of fibres, and where said system further comprises at least one ultrasound device adapted, during use, to apply ultrasound to the airborne flow of fibres before the binder solution is applied whereby fibre lumps, if any, in the airborne flow of fibres are separated, or substantially at the same time that the binder solution is applied whereby fibre lumps, if any, in the airborne flow of fibres are separated and binder droplets are reduced to a smaller size.

In one embodiment, the dryer is adapted to receive a flow of wet biomass particles and to dry the flow of wet biomass particles using a gaseous drying medium, wherein said dryer further comprises at least one ultrasound device or is in connection with at least one ultrasound device that, during use, is adapted to supply at least a part of said gaseous drying medium to said flow of biomass particles whereby a laminar sub-layer being present at the surface of said wet biomass particles is removed or minimized.

In one embodiment, the system further comprises a hot press adapted to receive said fibre or biomass mat from said forming station and to produce a fibreboard, such as a medium density fibreboard (MDF), Particleboards (PB), Oriented Strand Boards (OSB) or the like, from said fibre or biomass mat.

In one embodiment, at least one of said ultrasound devices comprises: an outer part and an inner part defining a passage, an opening, and a cavity provided in the inner part where said ultrasound device is adapted to receive a pressurized gas and pass the pressurized gas to said opening, from which the pressurized gas is discharged in a jet towards the cavity.

In one embodiment, the pressurized gas is hot air, steam or superheated steam.

The present invention also relates to a method of enhancing manufacturing biomass-based products, the method comprising: drying, by a dryer, an airborne flow of fibres or biomass particles, applying a binder solution, by a binder applicator, to an airborne flow of fibres received from said dryer, producing, by a forming station, a fibre or biomass mat from an airborne flow of fibres being applied with said binder solution and being received from said binder applicator, wherein the method further comprises one or more of: applying ultrasound, by at least one ultrasound device, to the airborne flow of fibres after said binder solution has been applied and before said airborne flow of fibres is processed in said forming station, applying ultrasound, by at least one ultrasound device, to the airborne flow of fibres in said forming station in connection with the production of said fibre or biomass mat, and applying ultrasound, by at least one ultrasound device, to said fibre or biomass mat after it has been produced by said forming station.

The method and embodiments thereof correspond to the device and embodiments thereof and have the same advantages for the same reasons.

Advantageous embodiments of the method according to the present invention are defined in the sub-claims and described in detail in the following.

BRIEF DESCRIPTION OF THE DRAWINGS

These and other aspects of the invention will be apparent with reference to the illustrative embodiments shown in the drawings, in which.

DESCRIPTION OF PREFERRED EMBODIMENTS

Figure 1A:
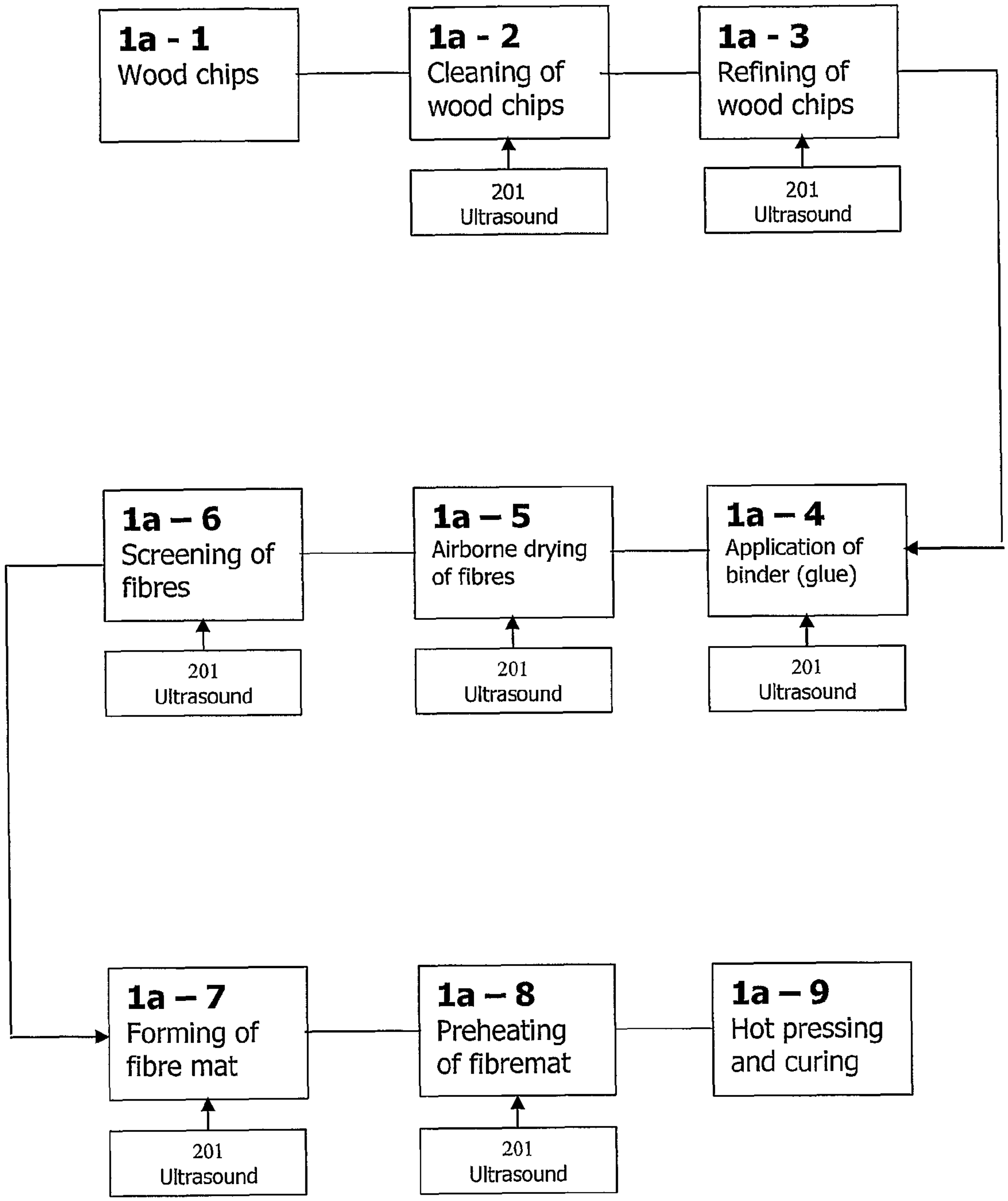
FIG. 1*a* shows a block diagram of a process flow in a Medium Density Fibreboard (MDF) manufacturing process.

The process of manufacturing of Medium Density Fibreboards (MDF) or the like is shown in FIG. 1*a* and the potential application of high-intensity ultrasound to support or replace part processes are marked in the FIG. (201).

In traditional MDF manufacturing biomass chips, preferably on the basis of debarked solid wood, are used as raw material (1*a*-1);

Bark residuals and dirt are removed from the chips in a chip washer (1*a*-2). Using this technique requires large amounts of clean water and produces large amounts of contaminated water, handling of which is a very costly process;

The wet chips are milled into fibres in a disc refiner (1*a*-3). Milling the biomass chips Into fibres in a disk refiner requires large amounts of electric energy and mechanical wear of machinery;

Usually, a aqueous solution of binder is added to the wet fibre furnish in the so-called blow-line at the outlet of the refiner (1*a*-4). In the blowline, the fibre furnish tend to agglomerate to large lumps and the binder added at this stage of the process has very limited access to the single fibres;

The fibre-binder mixture is dried in an airborne drying process using hot air as a heating and transportation medium (1*a*-5). Also during drying in an air-borne process the fibres tend to agglomerate and thus make drying inefficient. Additionally, the transfer of heat energy into the fibres and of water vapour out of the fibres is limited by the laminar boundary layer on the surface of the fibres. Alternatively, other techniques to add the binder to the fibre after drying (see e.g. Danish patent application PA 200401297 and patents quoted herein) are used in MDF manufacturing. Application of binder to the fibre furnish after drying is a more modern approach, the efficiency of which, however, in terms of binder distribution on the single fibres is limited by the tendency of the fibres to once again agglomerate into large lumps;

After drying of fibre and application of binder, the fibre furnish is screened, usually in an air-borne system, in order to remove larger fibre agglomerations, which may cause damage in the hot press (1*a*-6). Screening of the fibre furnish to remove fibre lumps is a costly process in terms of equipment, energy and loss of material;

Subsequently the fibre furnish is formed Into a homogeneous mat (1*a*-7), either by an airborne or by a mechanical device. Forming of the fibre mat in conventional formers establishes a 2 dimensional orientation of the fibres in the plane of the mat;

The fibre mat may be preheated by introducing steam or hot air or a mixture of steam and hot air into the surfaces of the mat (1*a*-8) may be made (optimally);

Finally, the mat is pressed and cured in a hot press (1*a*-9).

The majority of the part processes of MDF manufacturing is strained by problems in relation to separating particles: To separate contamination from the biomass chips, to disintegrate the chips into fibres, and to keep the fibres separated throughout the process steps of drying of fibre, application of binder and forming of the fibre mat. Further, the efficiency of the process of drying fibres in an air-borne process using hot air or superheated steam as a transportation and heating medium is limited by the presence of a laminar boundary layer of air at the surface of the fibres. The part processes in which the application of high-intensity ultrasound has the potential of improvement are marked in FIG. 1*a* (201).

Figure 1B:
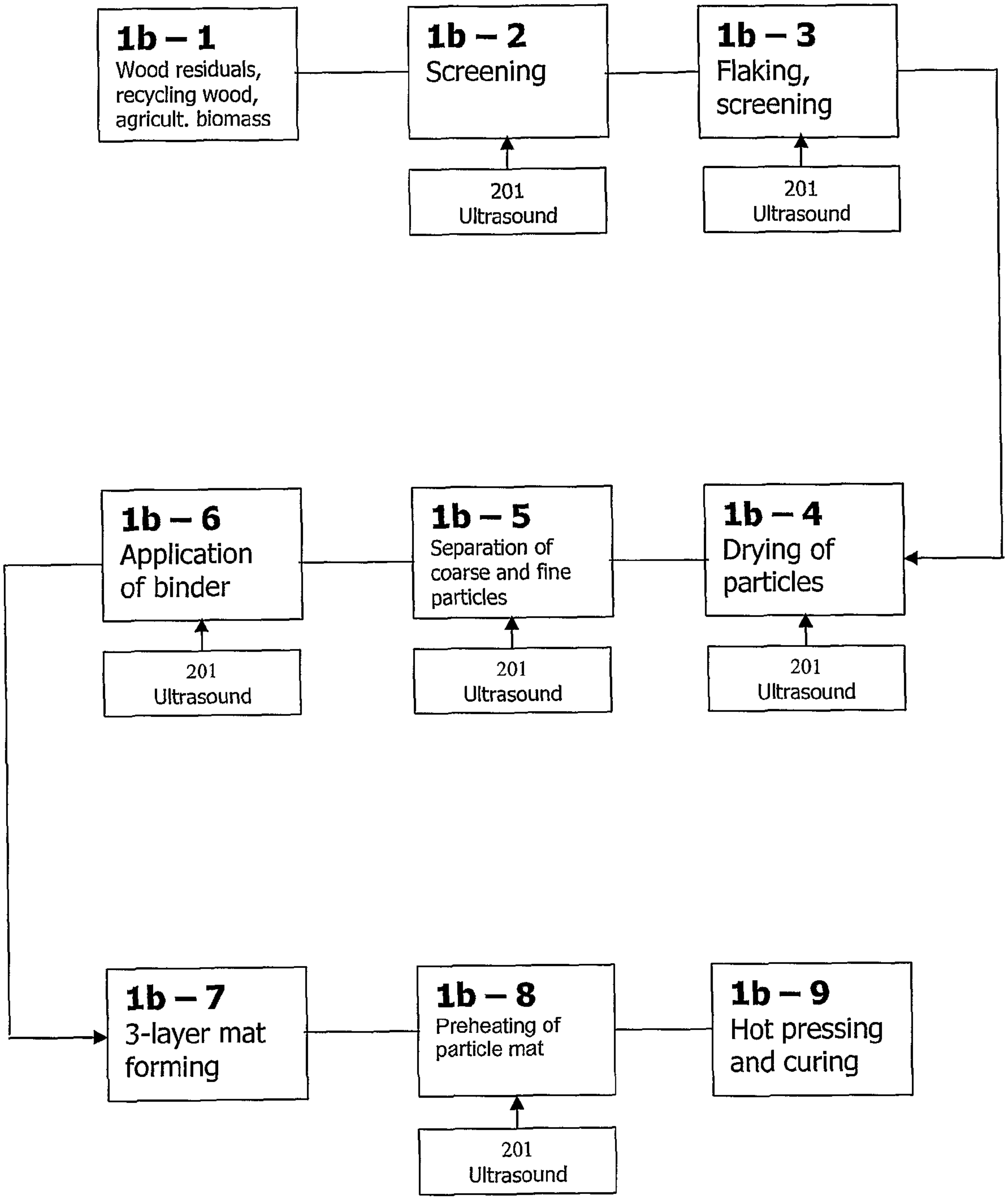
FIG. 1*b* shows a block diagram of a process flow in a Particleboard (PB) manufacturing process.

The process of manufacturing Particleboards (PB) is schematically shown in FIG. 1*b* and the potential applications of high-intensity ultrasound to support or replace part processes are marked in the Figure (201).

In Particleboard manufacturing, a wider variety of low quality raw material is used (wood residuals, recycling wood, agricultural biomass etc. (1*b*-1);

Screening into coarse and fine particles (1*b*-2). The efficiency of screening biomass particles by means mechanical sifters or air-borne equipment is limited by the tendency of fine particles and dirt to stick to larger particles;

Large particles are flaked into proper size (1*b*-3);

The particle furnish is dried, usually in drum dryers using hot gas as a heating medium and mechanical devices as a transportation medium (1*b*-4). The efficiency of the process is limited by the laminar boundary layer at the surface of the particles;

The dry particle furnish is usually separated (1*b*-5) into a fine fraction to be used for the panel surface and a coarse fraction to be used for the panel core. The separation of coarse and fine particles by traditional mechanical or air-borne techniques is limited by the tendency of coarse and fine particles to stick together;

A binder is added to these fractions separately in mechanical blenders (1*b*-6);

The fractions of particle furnish are formed into a 3-layer mat (1*b*-7).

The particle mat may be preheated by introducing steam or hot air or a mixture of steam and hot air into the surfaces of the mat (1*b*-8);

The mat is pressed and cured in a hot press (1*b*-9).

Figure 1C:
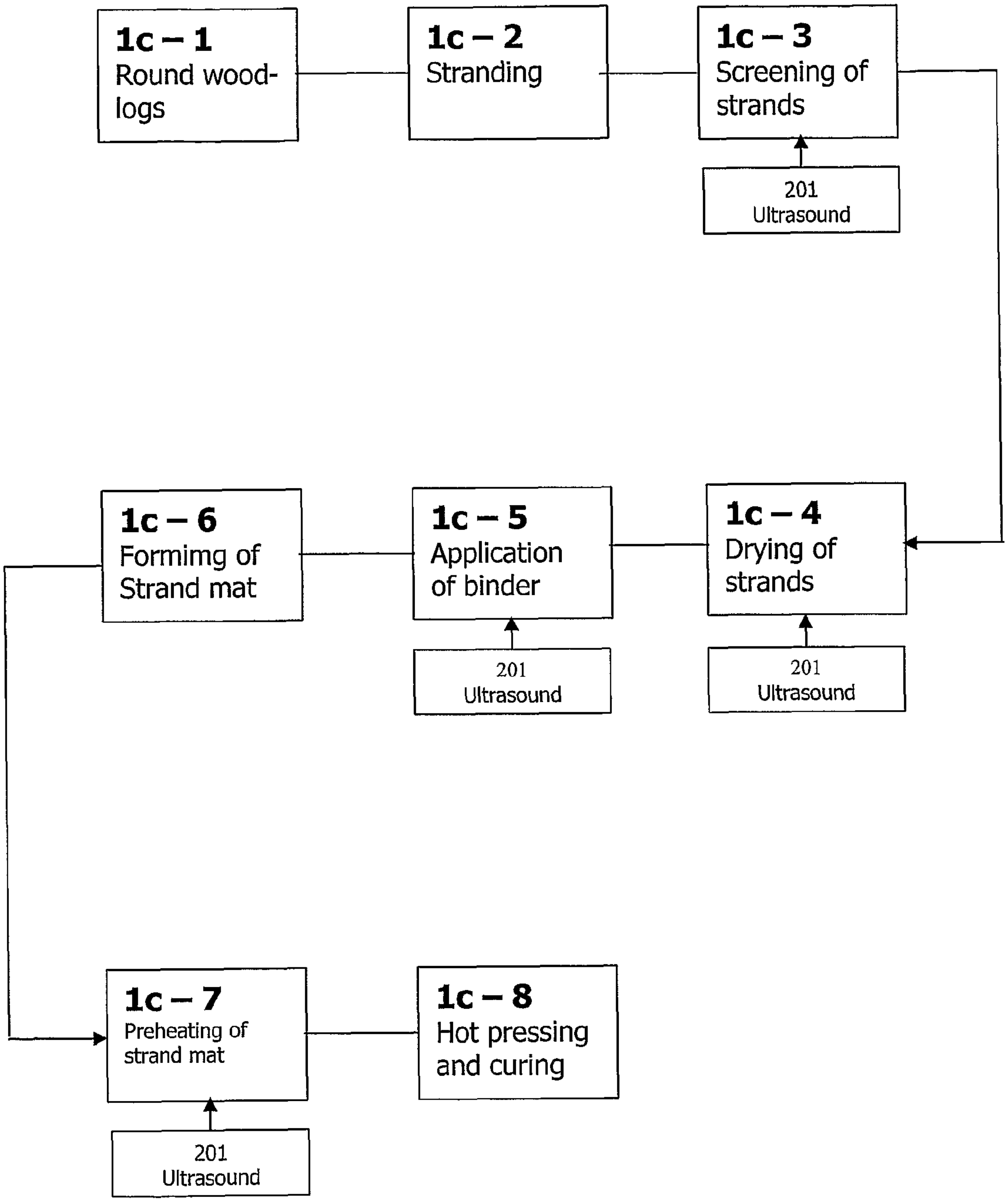
FIG. 1*c* shows a block diagram of a process flow in an Oriented Strand Board (OSB) manufacturing process.

The process of manufacturing Oriented Strand Boards (OSB) is schematically shown in FIG. 1*c* and the potential application of high-intensity ultrasound to support or replace part processes are marked in the Figure (201).

Oriented Strand Boards (OSB) are made from regular, debarked round wood from the forest (1*c*-1);

The logs are cut into thin (0.5-0.7 mm), wide (20-25 mm) and long (100-150 mm) strands (1*c*-2);

Cleaning of the strands from dirt and bark contamination is made in a dry process in mechanical sifters (1*c*-3). The efficiency of traditional cleaning of strands from dirt and bark contaminations in mechanical sifters is limited by the adhesion of fine particles and dirt to the rough surface of the strands;

Drying of strands is made in drum dryers using hot gas as a drying medium and mechanical devices for transportation of the strands (1*c*-4).

The process is limited by the laminar boundary layer at the surface of the strands;

Application of binder in the form of a powder or an aqueous solution of resin is made in rotating drums (1*c*-5);

Forming of strands into a mat is made in mechanical devices, orientating the strands into 3 layers parallel and perpendicular to the process direction, respectively (1c -6);

The strand mat may be preheated by introducing steam or hot air or a mixture of steam and hot air into the surfaces of the mat (1*c*-7);

The mat is pressed and cured in a hot press (1*c*-8).

Common to all 3 manufacturing processes of biomass-based panel board products as illustrated in FIG. 1*a*-1*c* is a number of problems with relation to the boundary layer of air between the particles and the surrounding process atmosphere of air, steam or another gas, e.g.:

Biomass particles tend to stick together,

Biomass particles and contaminating particles tend to stick together,

The exchange of heat energy and moisture at the surface of the particles is inefficient.

Traditionally, these problems are dealt with by applying shear forces to the flow of particles using a turbulent gas flow. Alternatively, especially in cleaning and screening techniques, shear forces are applied to the particle flow by mechanical vibrations or washing water.

It is the object of the present invention to provide a system and corresponding method to apply shear forces to the particle flow and the process atmosphere to overcome the above problems in a more efficient way than traditional techniques, using a novel kinetic technique.

Unlike the above mentioned traditional techniques, the invention is based on high-intensity sound or ultrasound waves created by means of a special device driven by pressurized gas such as atmospheric air, steam or other gases. High-intensity sound or ultrasound in gases leads to very high velocities and displacements of the gas molecules. I.e. a sound level of 160 dB corresponds to a velocity of 4.5 m/sec and a displacement of 33 μm at a frequency of 22.000 Hz. In other words, the kinetic energy of the gas molecules increases significantly.

The distance between gas-molecules moving in one direction and having the maximal velocity and gas-molecules moving the opposite direction is given by half the wavelength of the ultrasound. The resulting effect is a very efficient separation of the fibre lumps into single fibres.

Applied to biomass particles, e.g. an air-borne flow of fibre lumps, the kinetic energy and the displacements create a field of shear forces in the fibres and thus tears the fibre lumps apart into single fibres. The same effect is obtained i.e. by applying high-intensity sound or ultrasound to biomass particles contaminated with adhering particles of bark and dirt or large particles with adhering smaller particles which are difficult to unstick by traditional means like mechanical vibration or washing water.

In the following firstly, the application of the technique according to the present invention in a number of process steps within the manufacturing processes as illustrated in FIG. 1*a-c* is described. Other applications within the area of manufacturing of biomass-based panel board products or within other product manufacturing processes characterized by the same problems and features as described above are included in the invention;

Secondly, the effect of applying high-intensity sound or ultrasound to a flow of biomass-based particles will be described, using as an example the application of an aqueous solution of binder to an air-borne flow of dry fibres—or fibre lumps—in an MDF manufacturing process;

Thirdly, a preferred embodiment of a device designed to create high-intensity ultrasound, driven by a pressurized gas, will be described.

Raw Material Cleaning/Screening

Cleaning/screening from sand, dirt and other contaminants is usually made by means of water (chip washing in the MDF process, 1*a*-2) or mechanical sifters/screeners (chips, particles for particleboards or strands for OSB, FIGS. 1*b*-2, 1*c*-3).

Using the ultrasound device to replace or support the traditional cleaning techniques will improve the cleaning effect as the ultrasound efficiently unsticks/removes dirt particles from the biomass particle surface as described below.

High intensive sound or ultrasound in gases leads to very high velocities and displacements of the gas molecules. For example, 160 dB corresponds to a particle velocity of 4.5 m/s and a displacement of 33 μm at 22.000 Hz. In other words, the kinetic energy of the molecules has been increased significantly.

The distance between gas-molecules moving in one direction and having the maximal velocity and gas-molecules moving the opposite direction is given by half the wavelength of the ultrasound. The resulting effect is a very efficient separation of the fibre lumps into single fibres.

Also, for separation of particles of various size and shape as used in multilayer particleboards or Oriented Strand Boards, the separating effect of the high intensity ultrasound can be utilised to support the effect of the mechanical sifters/screeners (FIG. 1*b*-2, 1*b*-5, 1*c*-3).

Refining of Chips

In the process of refining biomass chips in a pressurised refiner, (FIG. 1*a*-3), saturated steam at high pressure is fed into the cavity between the refiner discs. Feeding the steam into the refiner through one or more of the above mentioned ultrasound generators directed into the refiner cavity, a high-intensive ultrasound level is established which assists a fully or partly disintegration of the biomass chips. As a result, the mechanical energy used in the refiner can be reduced significantly.

Besides, the high-intensity ultrasound helps keep the refiner discs clean from resin and other contaminations and to prevent clogging up the grooves of the refiner disc.

Application of Binder on Wet Fibre Furnish

In the traditional MDF manufacturing process the wet fibre furnish from the refiner is fed into the so-called blowline and an aqueous solution of binder is added (FIG. 1*a*-4). As well known, the fibre furnish in this stage forms large lumps, and consequently the application of binder is very inhomogeneous. Using one or more ultrasound devices at various positions along the blowline, preferably both before and after the application of binder, will produce a very homogeneous distribution of the binder onto the single fibres.

Drying of Biomass Particles

Traditional drying of biomass particles such as fibres (FIG. 1*a*-5), particles (FIG. 1*b*-4), strands (FIG. 1*c*-4) or the like by means of hot air or steam is hindered by the so-called laminar sub-layer at the surface of the drying particles.

Independently of the type of dryer and thermal conditions in relation hereto, a basic condition will always command and limit the efficiency of the drying process: namely the energy and mass (moisture) exchange at the surface of the biomass particles (i.e. heat in, moisture out).

The energy and mass exchange at the surface of the biomass particles is largely determined by the character of the gas flow and more specifically by the character or presence of the so-called laminar sub-layer. Heat transport across the laminar sub layer will be by conduction or radiation, due to the nature of laminar flow while mass transport across the laminar sub layer will be solely by diffusion. This will be explained in greater detail in a later part of this chapter.

It is an object of the present invention to provide a system and a corresponding method for drying a flow of biomass particles that solves (among other things) the above-mentioned shortcomings of prior art.

The ultrasound technique removes this sub layer very efficiently and thus facilitates the exchange of heat and water vapour (heat in, water vapour out) significantly.

The technique can be applied in all kinds of dryers (drum dryers for larger particles, tube dryers for fibres) and drying medium (hot air or steam).

It is a further object of the present invention to provide an efficient drying of biomass particles using less energy than required by traditional processes.

Yet another object is to provide methods and equipment for drying of biomass particles enabling acceleration of the drying process compared to traditional processes.

These objects (among others) are solved by a system for drying a flow of biomass particles, the system comprising: a dryer adapted to receive a flow of wet biomass particles and to dry the flow of wet biomass particles using a gaseous drying medium, wherein the dryer comprises at least one ultrasound device (301) or is in connection with at least one ultrasound device (301), where said at least one ultrasound device is adapted, during use, to supply at least a part of said gaseous drying medium to said flow of biomass particles.

High intensive sound or ultrasound in gases leads to very high velocities and displacements of the gas molecules. For example, 160 dB corresponds to a particle velocity of 4.5 m/s and a displacement of 33 μm at 22.000 Hz. In other words, the kinetic energy of the molecules has been increased significantly.

The distance between gas-molecules moving in one direction and having the maximal velocity and gas-molecules moving the opposite direction is given by half the wavelength of the ultrasound. The resulting effect is a very efficient separation of the fibre lumps into single fibres.

In this way, a more efficient drying of the biomass particles is obtained, which results in a significant reduction in drying time and power consumption of the dryer. The reason is that the ultrasound minimizes or eliminates the laminar sub-layer, as described elsewhere, where the absence of the sub-layer enables a much enhanced heat and moisture exchange. The application of ultrasound (201) intensifies very efficiently the energy and mass exchange at the surface of the biomass particles and thus helps to reduce the drying time of the biomass particles, to reduce the volume of the dryer vessel, to reduce the surplus volume of drying medium needed to establish heat and mass transfer at the surface of the biomass particles under non-optimal conditions, and to improve the thermal efficiency of the process significantly.

In a preferred embodiment, at least one ultrasound device is activated by at least a part of the gaseous drying medium.

In this way, the large amount of energy typically present in such systems is utilized in generating ultrasound with a high effect and efficiency. Further, since the gaseous drying medium is present in traditional systems already less modifications are needed for modifying traditional system into applying the present invention.

In one embodiment, the gaseous drying medium is hot air or superheated steam.

Figure 4:
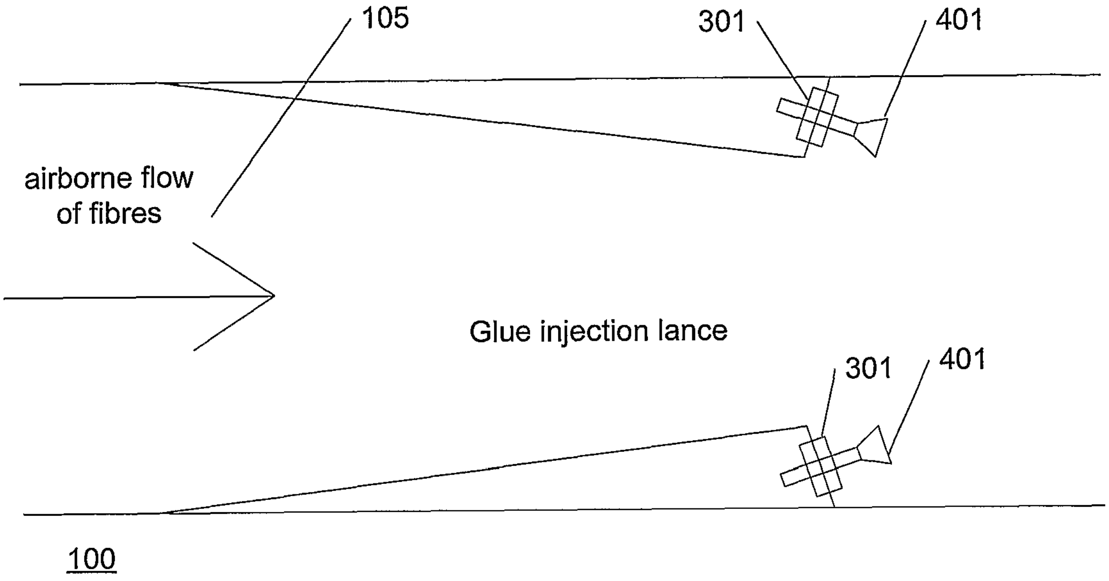
FIG. 4 schematically illustrates a part a system where ultrasound is applied to one embodiment (application of binder to the flow of dry fibres in an MDF process) of the present invention.

The present invention also relates to a method of drying a flow of biomass particles, the method comprising the step of: drying a received flow of wet biomass particles using a gaseous drying medium, wherein the step of drying comprises supplying at least a part of said gaseous drying medium to said flow of biomass particles using at least one ultrasound device (FIG. 4, 301).

In one embodiment, the flow of biomass particles is an airborne flow of fibres (FIGS. 1*a*-4, FIG. 4).

In one embodiment, the system further comprises binder application means for applying a binder solution to said flow of biomass particles before they are received in said dryer (FIGS. 1*a*-4).

In one embodiment, the flow of biomass particles is a mechanically activated flow of larger biomass particles such as particles for traditional particleboards (FIGS. 1*b*-6) or strands for Oriented Strand Boards, (FIGS. 1*c*-5) or similar biomass-based products.

In one embodiment, the dryer comprises a plurality of ultrasonic devices for supplying at least a part of said gaseous medium (FIG. 4, 301).

In one embodiment, the gaseous drying medium is hot air or superheated steam.

In one embodiment, the system further comprises binder application means for applying a binder solution comprising binder droplets to the flow of biomass particles wherein the binder application means comprises at least one ultrasound device adapted, during use, to apply ultrasound to the flow of biomass particles before the binder solution is applied, whereby particle lumps, if any, in the flow of biomass particles are separated, or substantially at the same time that the binder solution is applied whereby particle lumps, if any, in the flow of biomass particles are separated and binder droplets are reduced to a smaller size.

Application of Binder on Dry Particles

Application of binder to the biomass particles after drying is limited by the access of the binder droplets from the spraying device to the single particles. Also in this stage of the process MDF fibres tend to agglomerate into large lumps and thus prevent contact with the binder droplets.

To achieve a homogeneous distribution of the binder droplets in a device used in the process after the dryer, these fibre lumps are to be separated into single fibres.

At the same time, the binder preferably has to be atomised into droplets of a proper size in relation to the size of the fibres and they have to be brought into contact with the fibres to ensure a homogeneous distribution on the fibre surfaces.

Besides, the binder droplets preferably have to have a specific viscosity to adhere sufficiently to the fibre surfaces without becoming fully absorbed, and they must be prevented from sticking to the walls of the device.

Unlike the blow-line application of binder (FIGS. 1*a*-4), the dry application of binder after the dryer does not offer the opportunity of homogenizing the mixture during the long travel through the tube dryer.

Therefore all the above mentioned conditions in relation to traditional application of binder to dry fibres are to be satisfied within little time and space.

In the following, a novel method based on a different kinetic technique and an equipment to handle the fibres and binder droplets will be disclosed.

It is an object of the present invention to provide a system (and corresponding method) for applying a binder to an airborne flow of fibres, that solves (among other things) the above-mentioned shortcomings of prior art.

It is a further object to provide a method and system enabling efficient separation of fibres in an airflow while applying binder to the fibres.

Another object is to enable a more uniform and effective distribution of binder to fibres in an airflow.

An additional object of the present invention is to improve the probability of collision between fibres and binder droplets in an air stream in order to further homogenize the binder distribution.

These objects (among others) are solved by a system (FIG. 4) for applying a binder to an airborne flow of fibres (105), the system comprising: means for applying a binder solution comprising binder droplets to an airborne flow of fibres, wherein said system further comprises at least one ultrasound device adapted (301), during use, to apply ultrasound to the airborne flow of fibres (105) before the binder solution is applied (401) whereby fibre lumps (FIG. 2*a-d*, 201, 202, 204), if any, in the airborne flow of fibres are separated, or substantially at the same time that the binder solution is applied whereby fibre lumps, if any, in the airborne flow of fibres are separated and binder droplets are reduced to a smaller size (FIG. 2*b-d*, 201, 203).

Like the known methods, the invention is based on the application of shear forces to split the fibre lumps and binder droplets. However, according to the present invention, the shear forces are not produced by means of turbulent air flow, but by means of ultrasonic waves created by means of a special device driven by a pressurized gas such as atmospheric air, steam or other gases.

High intensive sound or ultrasound in gases leads to very high velocities and displacements of the gas molecules. For example, 160 dB corresponds to a particle velocity of 4.5 m/s and a displacement of 33 μm at 22.000 Hz. In other words, the kinetic energy of the molecules has been increased significantly.

The distance between gas-molecules moving in one direction and having the maximal velocity and gas-molecules moving the opposite direction is given by half the wavelength of the ultrasound. The resulting effect is a very efficient separation of the fibre lumps into single fibres.

Figure 2A:
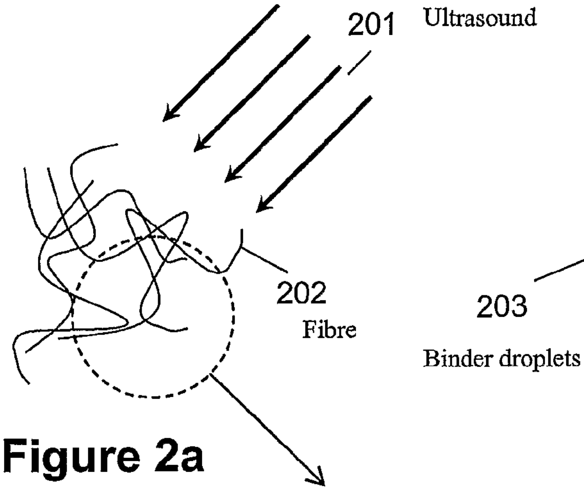
FIGS. 2*a*-2*d* illustrate effects of applying high-intensity ultrasound to solid particles—demonstrated by showing biomass fibres and binder droplets. Fibre lumps are separated into single fibres, binder drops are dissolved into microscopic droplets, and binder droplets are homogeneously distributed on the single fibre surface.
Figure 2B:
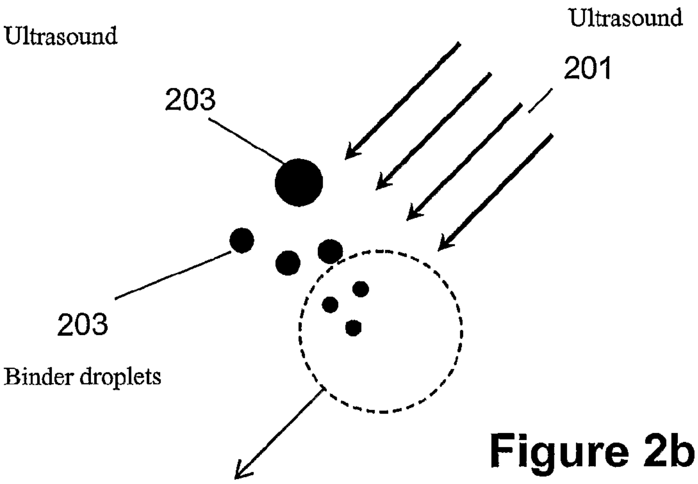

In FIG. 2*b* ultrasound (201) is applied to the large/normal sized binder droplets (203) e.g. from a spraying nozzle (not shown; see e.g. FIG. 4) where the movement of the gas-molecules tears the droplets into smaller and finely distributed droplets (203). At 22 kHz, 160 dB the maximum displacement of the gas-molecules will be 33 μm, see 204 in FIG. 2*d*.

Figure 2C:
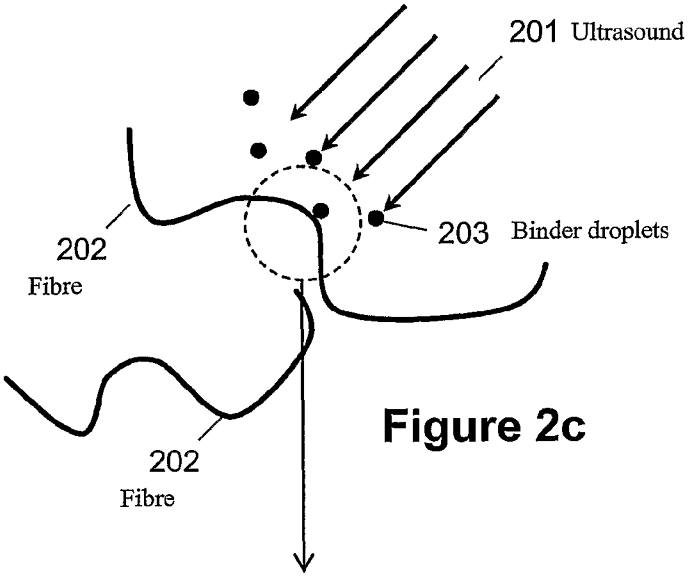
Figure 2D:
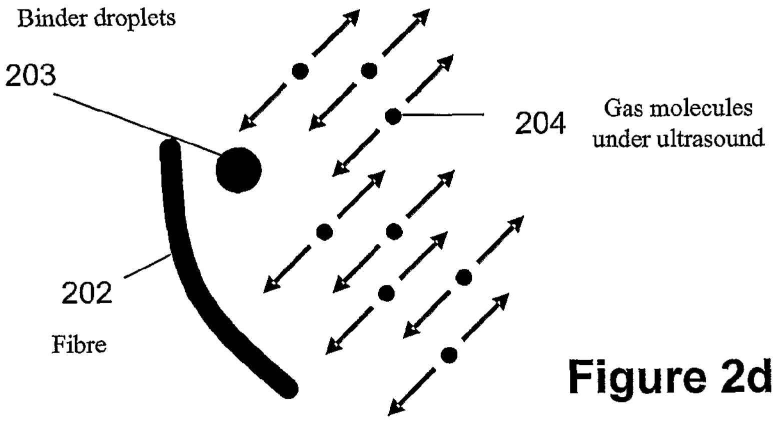

In FIGS. 2*c* and 2*d* the single fibres (202), typically having a diameter in the range of 20-50 μm, and the finely distributed binder droplets (203), both oscillating with a frequency of 22 kHz due to the application of ultrasound, are brought into close contact at high velocity to facilitate the contact.

Establishing the contact between fibres (202) and binder droplets (203) as well as the exchange of energy and moisture between the particles and the atmosphere is governed by the conditions as summarized below.

In one embodiment, the pressurized gas is in a first step cooled to a low temperature, preferably below 3° C., and dried, and in a second step heated up to a temperature below 100° C., preferably 50-70° C. thereby drying the surface of the fibres and the binder droplets on the fibre surface.

In one embodiment, steam is used as a part of the pressurized gas to drive the ultrasonic device and to add moisture and heat to the fibres as further a means to control the total moisture content and temperature of the fibre furnish.

In one embodiment, an equal electrostatic potential (++ or ÷÷) is applied to both the means for applying a binder solution and to walls of said system, in which the binder is applied to the fibres.

In one embodiment, a plurality of ultrasonic devices (301) are installed as one or several rings along walls of a duct, where the binder solution is applied to the airborne flow of fibres.

In one embodiment, the ultrasonic device(s) (301) and the means for applying a binder solution (401) are used in combination with a section of a duct shaped as a venturi nozzle, where the duct is positioned where the binder solution is applied to the airborne flow of fibres.

In one embodiment, the means for applying a binder solution comprises at least one spray nozzle (401) and in that the at least one ultrasonic device (301) are integrated with the at least one spray nozzle (401).

In one embodiment, the at least one ultrasound device (301) and the means for applying a binder (401) solution are directed in the same direction as the transport air flow.

In one embodiment, the binder is applied in a place in a vertically or approximately vertically oriented body of angular or tubular or conical shape, where the transport of the fibres take place mainly by gravity, and where the at least one ultrasound device (301) or at least a part of the at least one ultrasound device are oriented in an upward angle to meet the fibres falling from a top inlet of fibres to a fibre outlet at the bottom of the device.

In one embodiment, a number of the ultrasound devices (301) are oriented in an angle to the length axis of the system (i.e. the ultrasound devices are 'tilted') and the main transport direction as to create a spiral-shaped flow of the fibres.

According to another aspect, the dryer comprises one or more ultrasound generators (301). In this way, a more efficient drying of the fibres is obtained, which result in a significant reduction in power consumption of the dryer. The reason is that the ultrasound minimizes or eliminates the laminar sub-layer, as described elsewhere, where the absence of the sub-layer enables a much enhanced heat and moisture exchange. This aspect may be utilized in connection with the use of ultrasound to separate fibres and/or reduce the size of the binder droplets or alone.

The method and embodiments thereof correspond to the device and embodiments thereof and have the same advantages for the same reasons.

Screening and Fibre Lump Separation

Sorting out of large and heavy lumps of fibres FIGS. 1*a*-6, which frequently cause damage of the steel belts in the continuous hot press is usually made in an airborne sifter, the so-called Z-sifter, a vertical, zig-zag-shaped duct with an upstream flow of air.

Experiments have demonstrated the ability of the ultrasound technique to more efficiently separate these fibre lumps into single fibres.

Thus, the technique is considered a powerful tool to improve or to replace the Z-sifter.

Mat Forming

The use of the ultrasound technique in the process of mat or sheet forming (FIGS. 1*a*-7) profits from the ability to establish a homogeneous airborne suspension of single fibres and, as the fibres are statically loaded by oscillation, a three-dimensional orientation of the single fibres and as a result a mat or a felt with improved properties is achieved.

The effect of high-intensity ultrasound on biomass particle surfaces

Figure 3A:
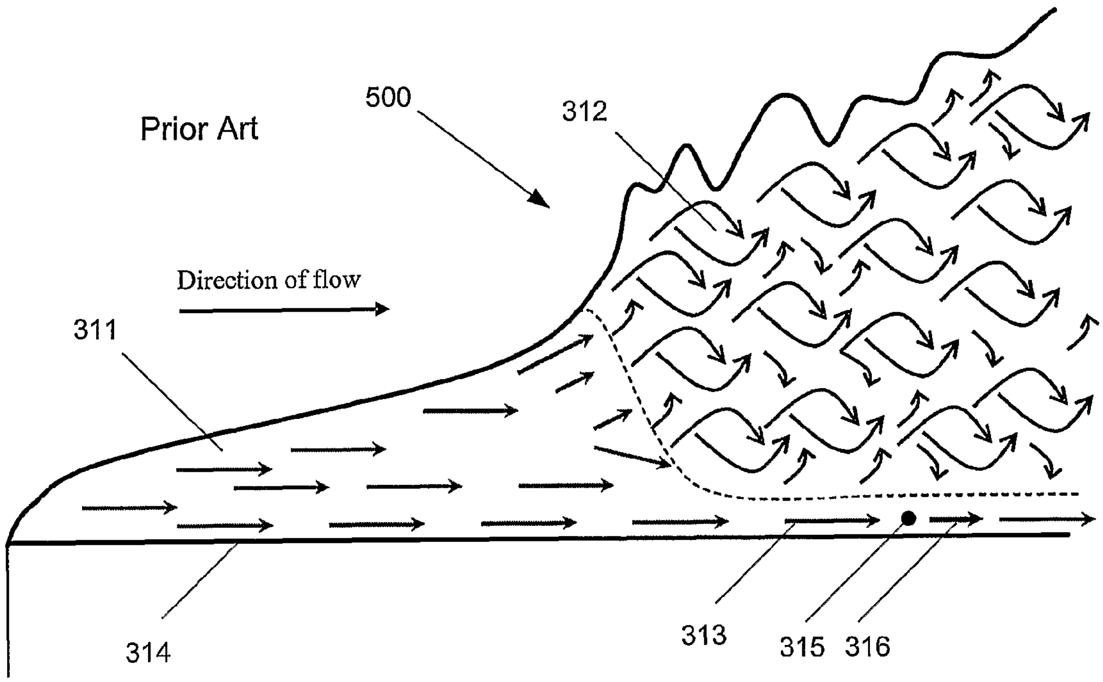
FIG. 3*a* schematically illustrates a turbulent air/gas flow over a surface of a solid body, e.g. a biomass particle according to prior art, i.e. when no ultrasound is applied.

For nearly all practically occurring gas flows, the flow regime will be turbulent in the entirety of the flow volume, except for a layer covering all surfaces wherein the flow regime is laminar (see e.g. 313 in FIG. 3*a*). This layer is often called the laminar sub layer. The thickness of this layer is a decreasing function of the Reynolds number of the flow, i.e. at high flow velocities, the thickness of the laminar sub layer will decrease.

FIG. 3*a* schematically illustrates a (turbulent) flow over a surface of an object according to prior art, i.e. when no ultrasound is applied. Shown Is a surface (314) of an object with a gas (500) surrounding or contacting the surface (314). As mentioned, thermal energy can be transported through gas by conduction and also by the movement of the gas from one region to another. This process of heat transfer associated with gas movement is called convection. When the gas motion is caused only by buoyancy forces set up by temperature differences, the process is normally referred to as natural or free convection; but if the gas motion is caused by some other mechanism, such as a fan or the like, it is called forced convection. With a condition of forced convection there will be a laminar boundary layer (311) near to the surface (314). The thickness of this layer is a decreasing function of the Reynolds number of the flow, so that at high flow velocities, the thickness of the laminar boundary layer (311) will decrease. When the flow becomes turbulent the layer are divided into a turbulent boundary layer (312) and a laminar sublayer (313). For nearly all practically occurring gas flows, the flow regime will be turbulent in the entirety of the streaming volume, except for the laminar sub-layer (313) covering the surface (314) wherein the flow regime is laminar. Considering a gas molecule or a particle (315) in the laminar sub-layer (313), the velocity (316) will be substantially parallel to the surface (314) and equal to the velocity of the laminar sub-layer (313). Heat transport across the laminar sub-layer will be by conduction or radiation, due to the nature of laminar flow. Mass transport across the laminar sub-layer will be solely by diffusion. The presence of the laminar sub-layer (313) does not provide optimal or efficient heat transfer or increased mass transport. Any mass transport across the sub-layer has to be by diffusion, and therefore often be the final limiting factor in an overall mass transport. This limits the interaction between binder droplets and fibres when binder droplets are dispersed in the gas and the object is a fibre. Further, the droplets are generally of a greater size and not as finely distributed.

Figure 3B:
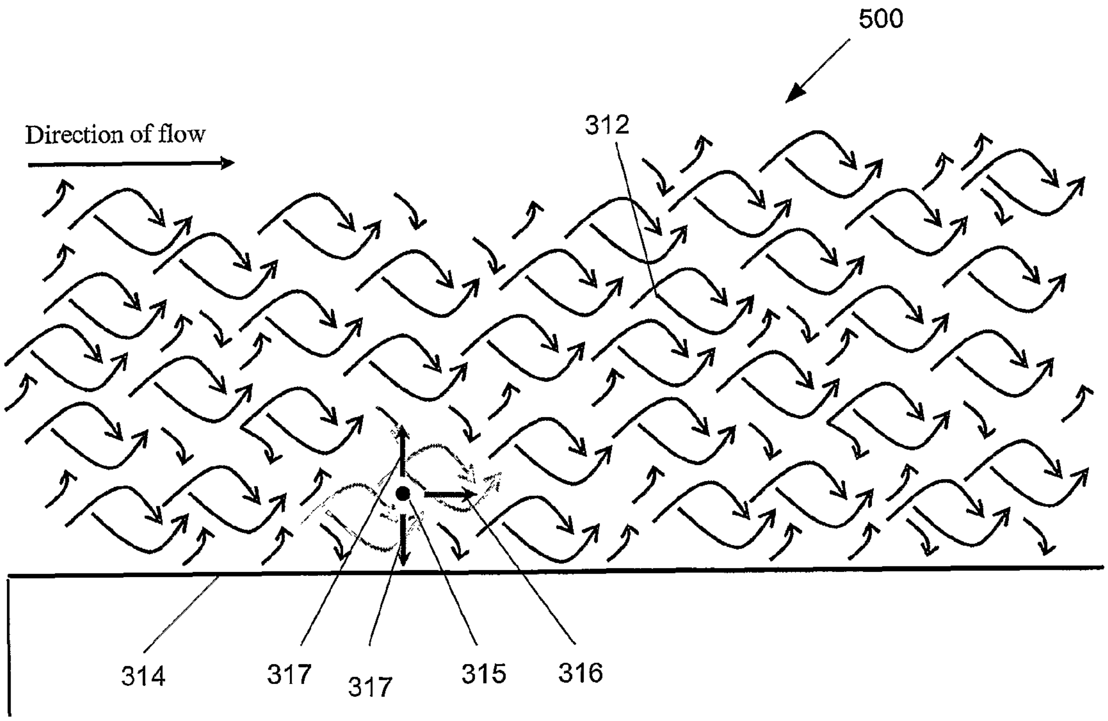
FIG. 3*b* schematically shows a flow over a surface of an object according to the present invention, where the effect of applying high intensity sound or ultrasound to/in air/gas surrounding or contacting a surface of an object is illustrated.

FIG. 3*b* schematically shows a flow over a surface of an object according to the present invention, where the effect of applying high intensity sound or ultrasound to/in air/gas (500) surrounding or contacting a surface of an object is illustrated. More specifically, FIG. 3*b* illustrates the conditions when a surface (314) of a fibre is applied with high intensity sound or ultrasound. Again consider a gas molecule/particle (315) in the same spatial position in the laminar layer as shown in FIG. 2*a*; the velocity (316) will be substantially parallel to the surface (314) and equal to the velocity of the laminar layer prior applying ultrasound. In the direction of the emitted sound field to the surface (314) in FIG. 3*b*, the oscillating velocity of the molecule (315) has been increased significantly as indicated by arrows (317). As an example, a maximum velocity of v=4.5 m/sec and a displacement of +/−32 μm will be achieved where the ultrasound frequency f=22 kHz and the sound intensity=160 dB. The corresponding (vertical) displacement in FIG. 3*b* is substantially since the molecule follows the horizontal air stream along the surface. In result, the ultrasound will establish a forced heat flow from the surface to surrounding gas/air (500) by increasing the conduction by minimizing the laminar sub-layer. The sound intensity is in one embodiment 100 dB or larger. In another embodiment, the sound intensity is 140 dB or larger. Preferably, the sound intensity is selected from the range of approximately 140-160 dB. The sound intensity may be above 160 dB.

The minimization of the sub-laminar layer has the effect that the mass trans-port between the surface of the fibre and the gas containing binder droplets is enhanced whereby a greater interaction between binder droplets and fibres is obtained.

Ultrasound Generating Device

The key method and device to be used in the invention shall be briefly described below.

According to the present invention, ultrasound is applied to the fibres by a suitable ultrasound generator (301) at various stages of the process of manufacturing biomass-based panel board products. In this way, the agglomerated particle lumps are transformed into a homogeneous flow of single particles using ultrasound from one or more ultrasound devices driven by pressurized air, steam or another pressurized gas. Many types of ultrasound generators (301) are suitable for this and one preferred well known ultrasound generator is explained in connection with FIGS. 5*a*-5*f*.

Figure 5A:
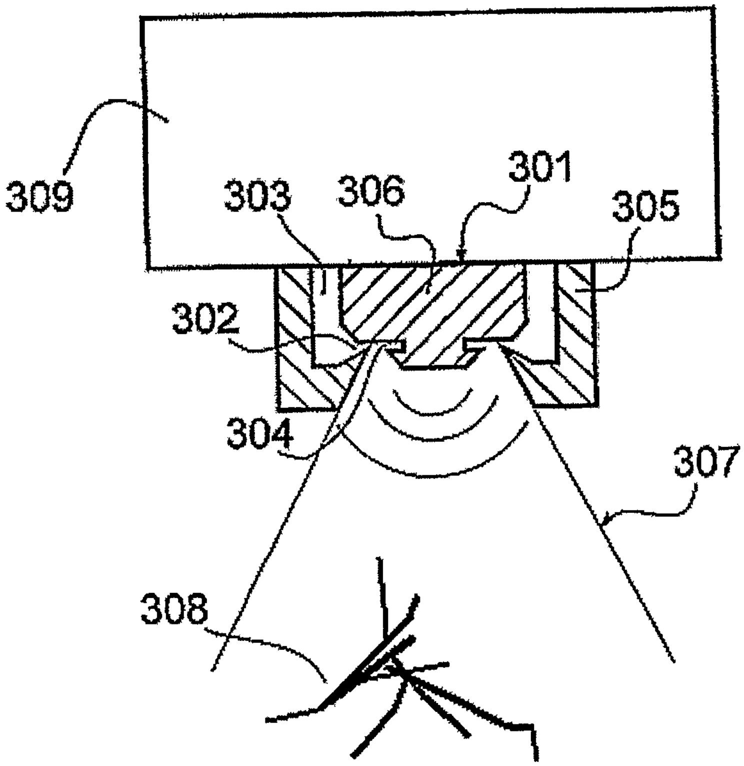
FIG. 5*a* schematically illustrates a preferred embodiment of a device generating high-intensity sound or ultrasound.

FIG. 5*a* schematically illustrates a preferred embodiment of a device (301) for generating high intensity sound or ultrasound. Pressurized gas is passed from a tube or chamber (309) through a passage (303) defined by the outer part (305) and the inner part (306) to an opening (302), from which the gas is discharged in a jet towards a cavity (304) provided in the inner part (306). If the gas pressure is sufficiently high then oscillations are generated in the gas fed to the cavity (304) at a frequency defined by the dimensions of the cavity (304) and the opening (302). An ultrasound device of the type shown in FIG. 5*a* is able to generate ultrasonic acoustic pressure of up to 160 $dB_{SPL}$ at a gas pressure of about 4 atmospheres. The ultrasound device may e.g. be made from brass, aluminium or stainless steel or in any other sufficiently hard material to withstand the acoustic pressure and temperature to which the device is subjected during use. The method of operation is also shown in FIG. 3*a*, in which the generated ultrasound 307 is directed towards the surface 308 of the fibres and binder droplets. Please note, that the pressurized gas can be different than the gas that contacts or surrounds the object.

Figure 5B:
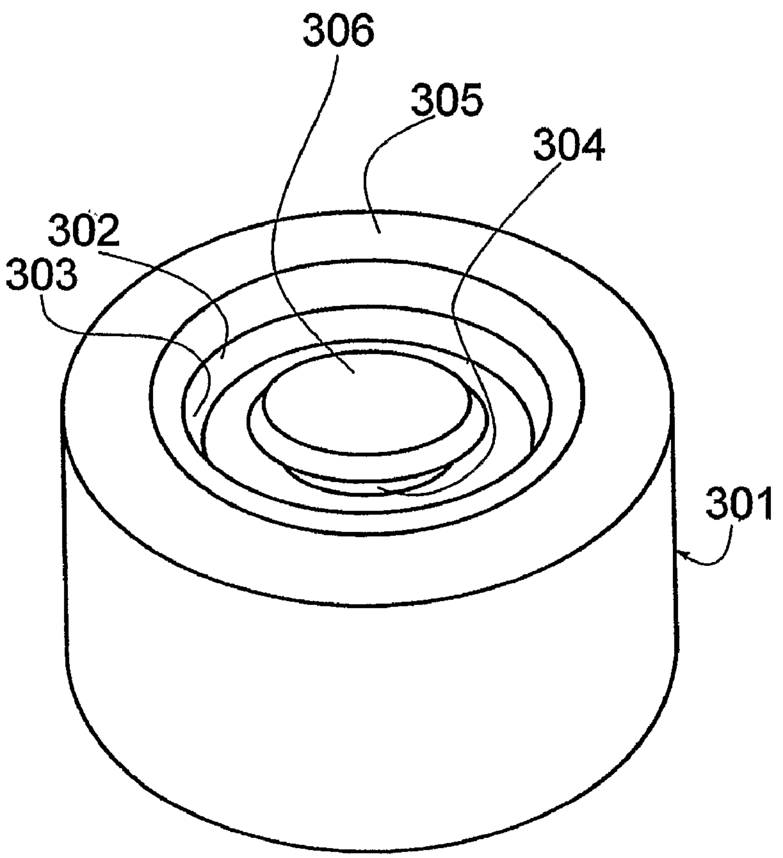
FIG. 5*b* schematically illustrates an embodiment of an ultrasound generating device in the form of a disc jet.

FIG. 5*b* shows an embodiment of an ultrasound device in form of a disc-shaped jet. Shown is a preferred embodiment of an ultrasound device (301), i.e. a so-called disc jet. The device (301) comprises an annular outer part (305) and a cylindrical inner part (306), in which an annular cavity (304) is recessed. Through an annular gas passage (303) gases may be diffused to the annular opening (302) from which it may be conveyed to the cavity (304). The outer part (305) may be adjustable in relation to the inner part (306), e.g. by providing a thread or another adjusting device (not shown) in the bottom of the outer part (305), which further may comprise fastening means (not shown) for locking the outer part (305) in relation to the inner part (306), when the desired interval there between has been obtained. Such an ultrasound device may generate a frequency of about 22 kHz at a gas pressure of 4 atmospheres. The molecules of the gas are thus able to migrate up to 36 μm about 22,000 times per second at a maximum velocity of 4.5 m/s. These values are merely included to give an idea of the size and proportions of the ultrasound device and by no means limit of the shown embodiment.

Figure 5C:
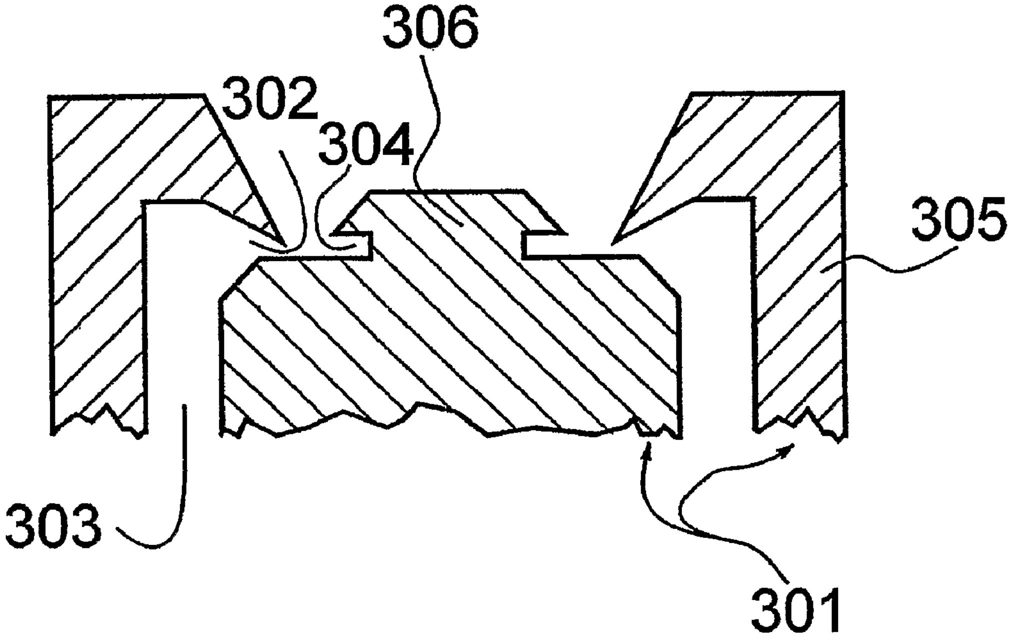
FIG. 5*c* is a sectional view along the diameter of the ultrasound device in FIG. 5*b* illustrating the shape of the opening, the gas passage and the cavity more clearly.

FIG. 5*c* is a sectional view along the diameter of the ultrasound device (301) in FIG. 5*b* illustrating the shape of the opening (302), the gas passage (303) and the cavity (304) more clearly. It is further apparent that the opening (302) is annular. The gas passage (303) and the opening (302) are defined by the substantially annular outer part (305) and the cylindrical inner part (306) arranged therein. The gas jet discharged from the opening (302) hits the substantially circumferential cavity (304) formed in the inner part (306), and then exits the ultrasound device (301). As previously mentioned the outer part (305) defines the exterior of the gas passage (303) and is further bevelled at an angle of about 30° along the outer surface of its inner circumference forming the opening of the ultrasound device, wherefrom the gas jet may expand when diffused. Jointly with a corresponding bevelling of about 60° on the inner surface of the inner circumference, the above bevelling forms an acute-angled circumferential edge defining the opening (302) externally. The inner part (306) has a bevelling of about 45° in its outer circumference facing the opening and internally defining the opening (302). The outer part (305) may be adjusted in relation to the inner part (306), whereby the pressure of the gas jet hitting the cavity (304) may be adjusted. The top of the inner part (306), in which the cavity (304) is recessed, is also bevelled at an angle of about 45° to allow the oscillating gas jet to expand at the opening of the ultrasound device.

Figure 5D:
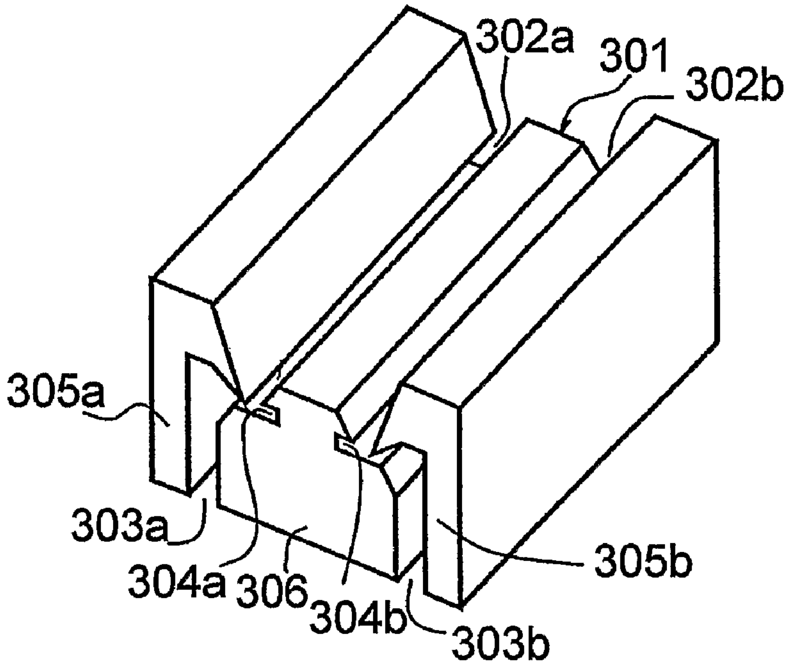
FIG. 5*d* illustrates an alternative embodiment of an ultrasound device, which is shaped as an elongated body.

FIG. 5*d* illustrates an alternative embodiment of a ultrasound device, which is shaped as an elongated body. Shown is an ultrasound device comprising an elongated substantially rail-shaped body (301), where the body is functionally equivalent with the embodiments shown in FIGS. 5*a* and 5*b*, respectively. In this embodiment the outer part comprises two separate rail-shaped portions (305*a*) and (305*b*), which jointly with the rail-shaped inner part (306) form a ultrasound device (301). Two gas passages (303*a*) and (303*b*) are provided between the two portions (305*a*) and (305*b*) of the outer part (305) and the inner part (306). Each of said gas passages has an opening (302*a*), (302*b*), respectively, conveying emitted gas from the gas passages (303*a*) and (303*b*) to two cavities (304*a*), (304*b*) provided in the inner part (306). One advantage of this embodiment is that a rail-shaped body is able to coat a far larger surface area than a circular body. Another advantage of this embodiment is that the ultrasound device may be made in an extruding process, whereby the cost of materials is reduced.

Figure 5E:
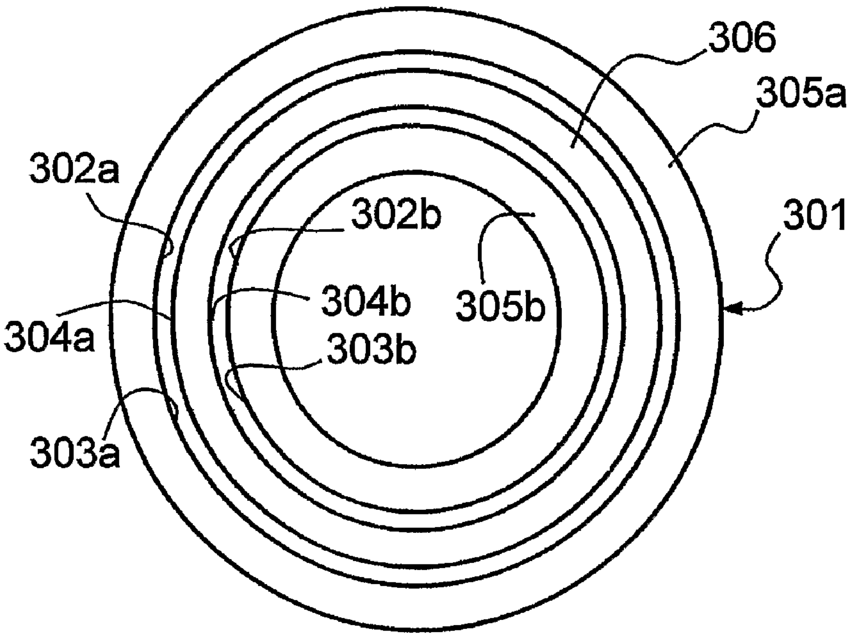
FIG. 5*e* shows an ultrasound device of the same type as in FIG. 3*d* but shaped as a closed curve.

FIG. 5*e* shows an ultrasound device of the same type as in FIG. 5*d* but shaped as a closed curve. The embodiment of the gas device shown in FIG. 5*d* does not have to be rectilinear. FIG. 5*e* shows a rail-shaped body (301) shaped as three circular, separate rings. The outer ring defines an outermost part (305*a*), the middle ring defines the inner part (306) and the inner ring defines an innermost outer part (305*b*). The three parts of the ultrasound device jointly form a cross section as shown in the embodiment in FIG. 5*d*, wherein two cavities (304*a*) and (304*b*) are provided in the inner part, an wherein the space between the outermost outer part (305*a*) and the inner part (306) defines an outer gas passage (303*a*) and an outer opening (302*a*), respectively, and the space between the inner part (306) and the innermost outer part (305*b*) defines an inner gas passage (304*b*) and an inner opening (302*b*), respectively. This embodiment of an ultrasound device is able to coat a very large area at a time and thus treat the surface of large objects.

Figure 5F:
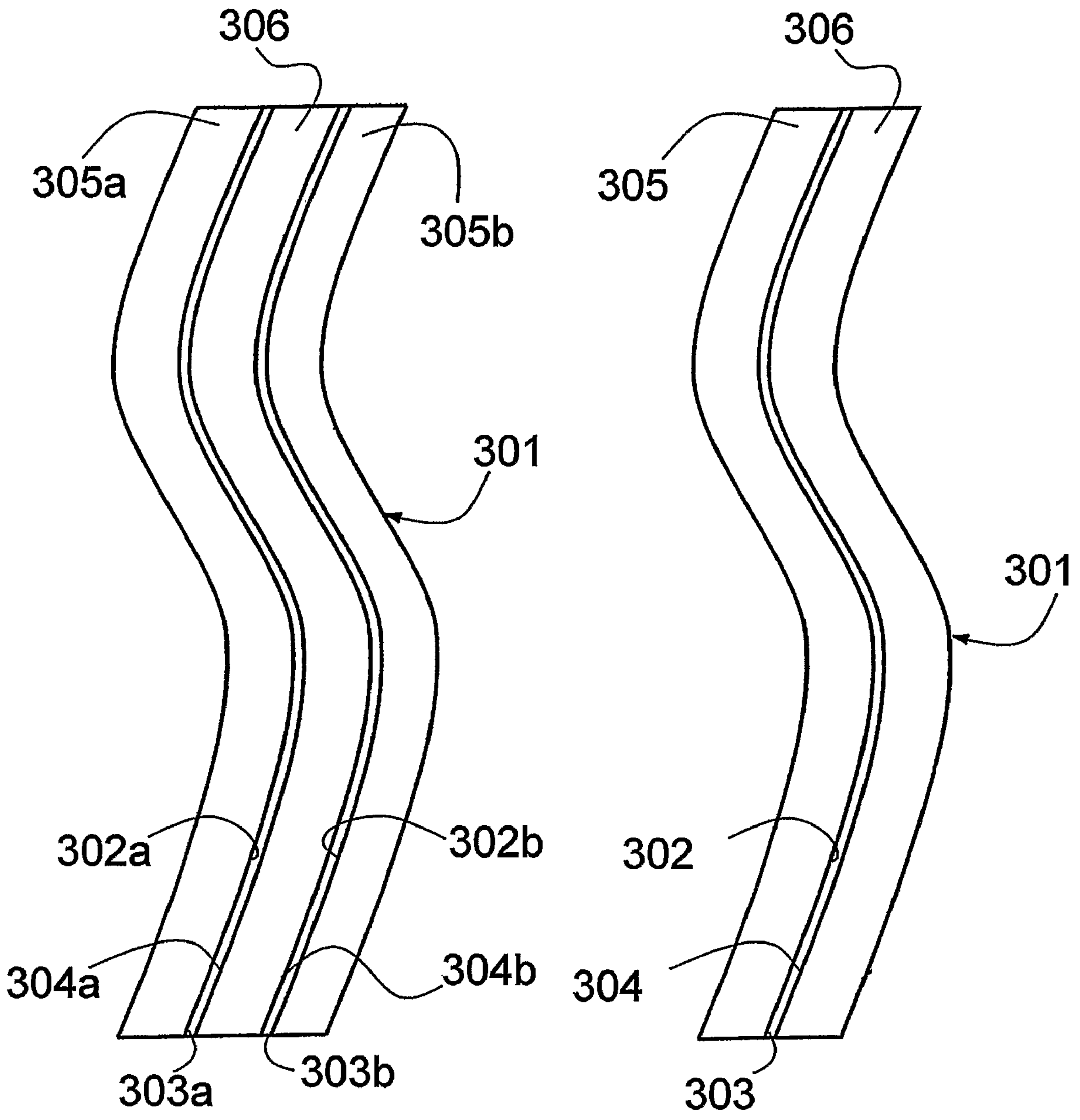
FIG. 5*f* shows an ultrasound device of the same type as in FIG. 3*d* but shaped as an open curve.

FIG. 5*f* shows an ultrasound device of the same type as in FIG. 5*d* but shaped as an open curve. As shown it is also possible to form an ultrasound device of this type as an open curve. In this embodiment the functional parts correspond to those shown in FIG. 5*d* and other details appear from this portion of the description for which reason reference is made thereto. Likewise it is also possible to form an ultrasound device with only one opening as described in FIG. 5*b*. An ultrasound device shaped as an open curve is applicable where the surfaces of the treated object have unusually shapes. A system is envisaged in which a plurality of ultrasound devices shaped as different open curves are arranged in an apparatus according to the invention.

Although the invention has been described in the above mainly in relation to processes of manufacturing various kinds of board products from biomass raw material such as solid wood, chips from solid wood, wood residuals, recycling wood or agricultural crop residuals, it shall be noted that the invention can also be applied to other biomass product manufacturing processes or manufacturing processes on the basis of other raw materials, as far as these processes are characterized by the same problems and features as described in the summary and scope of the invention. More specifically, the following examples can be mentioned:

Drying of bulk material, as e.g. grain, feedstock, cereal products etc;

Sifting, cleaning and grading of granular material, as e.g. inorganic materials like stone, gravel, sand, cement or organic material like chips, particles, fibres or dust to be utilized for other processes than panel board and related products;

Forming of mats, sheets or other shapes of products which require a specific structure and orientation of particles, like dry forming of paper, cardboard or non-woven organic sheets as e.g. tissues, napkins, nappies etc, or inorganic mats or sheets, e.g. insulating products like glass wool and similar products.

Thus the invention is not restricted to the described and shown embodiment, but may also be embodied in other ways within the scope of the subject-matter defined in the following claims.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention claimed is:

1. A system for enhancing manufacturing biomass-based products, the system comprising:

a dryer (101) for receiving an airborne flow of fibres or biomass particles (105), a binder applicator (102; 401) for applying a binder solution to an airborne flow of fibres (105) received from said dryer (101), a forming station (103) for producing a fibre or biomass mat (110) from an airborne flow of fibres being applied with said binder solution and being received from said binder applicator (102, 401), characterized in that said system further comprises one or more of:

at least one ultrasound device (301) adapted, during use, to apply ultrasound to the airborne flow of fibres (105) after said binder solution has been applied and before said airborne flow of fibres (105) is processed in said forming station (103), at least one ultrasound device (301) adapted, during use, to apply ultrasound to the airborne flow of fibres (105) in said forming station (103) in connection with the production of said fibre or biomass mat (110), and at least one ultrasound device (301) adapted, during use, to apply ultrasound to said fibre or biomass mat (110) after it has been produced by said forming station (103).

2. A system according to claim 1, characterized in that system is adapted to apply steam, superheated steam or hot air in connection with application of ultrasound to said airborne flow of fibres (105) after said binder solution has been applied and before said airborne flow of fibres (105) is processed in said forming station (103), and/or said airborne flow of fibres (105) in said forming station (103) in connection with the production of said fibre or biomass mat (110), and/or said fibre or biomass mat (110) before it is received in a pressing station (104).

3. A system according to claim 1, characterized in that said system comprises one or more ultrasound devices (301) adapted to replace or support traditional cleaning techniques whereby the cleaning effect is improved by the application of ultrasound that efficiently unsticks/removes dirt particles from the biomass particle surface.

4. A system according to claims 1, characterized in that said system comprises one or more ultrasound devices (301) adapted to enhance a separation effect in the process of separation of particles of various size and shape as used in multilayer particleboards or Oriented Strand Boards, where the separating effect by the application of ultrasound supports the effect of mechanical sifters/screeners.

5. A system according to claim 1, characterized in that said system comprises one or more ultrasound devices (301) adapted to apply ultrasound and steam into a refiner cavity in the process of refining pulp chips in a pressurised refiner where saturated steam at high pressure is fed into the cavity between the refiner discs whereby a high-intensive ultrasound level, which assists a fully or partly disintegration of the pulp chips, is established.

6. A system according to claims 1, characterized in that said system comprises one or more ultrasound devices (301) at various positions along a blowline, preferably both before and after the application of binder, adapted to produce a very homogeneous distribution of the binder on the single fibers in a traditional MDF manufacturing process where the wet fiber furnish from a refiner is fed into a blowline and an aqueous solution of binder is added.

7. A system according to claim 1, characterized in that said binder applicator (102; 401) is adapted to apply a binder solution comprising binder droplets (203) to said airborne flow of fibres (105), and where said system further comprises at least one ultrasound device (301) adapted, during use, to apply ultrasound to the airborne flow of fibres (105)

before the binder solution is applied whereby fibre lumps, if any, in the airborne flow of fibres (105) are separated, or substantially at the same time that the binder solution is applied whereby fibre lumps, if any, in the airborne flow of fibres (105) are separated and binder droplets are reduced to a smaller size.

8. A system according to claim 1, characterized in that said dryer (101) is adapted to receive a flow of wet biomass particles (105) and to dry the flow of wet biomass particles (105) using a gaseous drying medium, wherein said dryer (101) further comprises at least one ultrasound device (301) or is in connection with at least one ultrasound device (301) that, during use, is adapted to supply at least a part of said gaseous drying medium to said flow of biomass particles (105) whereby a laminar sub-layer (313) being present at the surface of said wet biomass particles (105) is removed or minimized.

9. A system according to claim 1, characterized in that said system further comprises a hot press (104) adapted to receive said fibre or biomass mat (110) from said forming station (103) and to produce a fibreboard from said fibre or biomass mat (110).

10. A system according to claim 1, characterized in that at least one of said ultrasound devices (301) comprises:

an outer part (305) and an inner part (306) defining a passage (303), an opening (302), and cavity (304) provided in the inner part (306)

where said ultrasound device (301) is adapted to receive a pressurized gas and pass the pressurized gas to said opening (302), from which the pressurized gas is discharged in a jet towards the cavity (304).

11. A system according to claim 10, characterized in that said pressurized gas is hot air, atmospheric air, steam or superheated steam or in that said gas comprises a combination of steam and atmospheric air.

12. A system according to claim 1, characterized in that said sound supports a separation of particles of various size in a biomass particle screening process.

13. A system according to claim 1, characterized in that said sound splits a biomass lump in a biomass particle lump separation process.

14. A system according to claim 1, further comprising means for mat preheating of said biomass particles, using steam or hot air or a mixture of steam and hot air, prior to a hot pressing, characterized in that said sound is applied before said hot pressing.

15. A method of enhancing manufacturing biomass-based products, the method comprising:

drying, by a dryer (101), an airborne flow of fibres or biomass particles (105), applying a binder solution, by a binder applicator (102; 401), to an airborne flow of fibres (105) received from said dryer (101), producing, by a forming station (103), a fibre or biomass mat (110) from an airborne flow of fibres being applied with said binder solution and being received from said binder applicator (102, 401), characterized in that said method further comprises one or more of:

applying ultrasound, by at least one ultrasound device (301), to the airborne flow of fibres (105) after said binder solution has been applied and before said airborne flow of fibres (105) is processed in said forming station (103), applying ultrasound, by at least one ultrasound device (301), to the airborne flow of fibres (105) in said forming station (103) in connection with the production of said fibre or biomass mat (110), and applying ultrasound, by at least one ultrasound device (301), to said fibre or biomass mat (110) after it has been produced by said forming station (103).

16. A method according to claim 15, characterized in that method comprises applying steam, superheated steam or hot air in connection with application of ultrasound to said airborne flow of fibres (105) after said binder solution has been applied and before said airborne flow of fibres (105) is processed in said forming station (103), and/or said airborne flow of fibres (105) in said forming station (103) in connection with the production of said fibre or biomass mat (110), and/or said fibre or biomass mat (110) before it is received in a pressing station (104).

17. A method according to claim 15, characterized in that said method comprises replacing or supporting, by one or more ultrasound devices (301), traditional cleaning techniques whereby the cleaning effect is improved by the application of ultrasound that efficiently unsticks/removes dirt particles from the biomass particle surface.

18. A method according to claim 15, characterized in that said method comprises enhancing, by one or more ultrasound devices (301), a separation effect in the process of separation of particles of various size and shape as used in multilayer particleboards or Oriented Strand Boards, where the separating effect by the application of ultrasound supports the effect of mechanical sifters/screeners.

19. A method according to claim 15, characterized in that said method comprises applying ultrasound and steam into a refiner cavity in the process of refining pulp chips in a pressurised refiner where saturated steam at high pressure is fed into the cavity between the refiner discs whereby a high-intensive ultrasound level, which assists a fully or partly disintegration of the pulp chips, is established.

20. A method according to claim 15, characterized in that said method comprises producing a very homogeneous distribution of the binder on the single fibers in a traditional MDF manufacturing process where the wet fiber furnish from a refiner is fed into a blowline and an aqueous solution of binder is added by one or more ultrasound devices (301) placed at various positions along a blowline, preferably both before and after the application of binder.

21. A method according to claim 15, characterized in that said binder applicator (102; 401) applies a binder solution comprising binder droplets (203) to said airborne flow of fibres (105), and where said method further comprises applying ultrasound, by at least one ultrasound device (301), to the airborne flow of fibres (105)

before the binder solution is applied whereby fibre lumps, if any, in the airborne flow of fibres (105) are separated, or substantially at the same time that the binder solution is applied whereby fibre lumps, if any, in the airborne flow of fibres (105) are separated and binder droplets are reduced to a smaller size.

22. A method according to claim 15, characterized in that said dryer (101) receives a flow of wet biomass particles (105) and dries the flow of wet biomass particles (105) using a gaseous drying medium, wherein said dryer (101) further comprises at least one ultrasound device (301) or is in connection with at least one ultrasound device (301) that supplies at least a part of said gaseous drying medium to said flow of biomass particles (105) whereby a laminar sub-layer (313) being present at the surface of said wet biomass particles (105) is removed or minimized.

23. A method according to claim 15, characterized in that said method further comprises receiving said fibre or biomass mat (110) in a hot press (104) from 20 said forming station (103) and producing, by the hot press (104), a fibreboard from said fibre or biomass mat (110).

24. A method according to claim 15, characterized in that at least one of said ultrasound devices (301) comprises:

an outer part (305) and an inner part (306) defining a passage (303), an opening (302), and a cavity (304) provided in the inner part (306)

where said ultrasound device (301) receives a pressurized gas and passes the pressurized gas to said opening (302), from which the pressurized gas is discharged in a jet towards the cavity (304).

25. A method according to claim 24, characterized in that said pressurized gas is hot air, atmospheric air, steam or superheated steam or in that said gas comprises a combination of steam and atmospheric air.

26. A method according to claim 15, characterized in that said step of applying sound supports a separation of particles of various size in a biomass particle screening process.

27. A method according to claim 15, characterized in that said step of applying sound splits a biomass lump in a biomass particle lump separation process.

28. A method according to claim 15, further comprising a step of mat preheating of said biomass particles, using steam or hot air or a mixture of steam and hot air, prior to a hot pressing, characterized in that said step of applying sound is applied before said hot pressing.

* * * * *